US005441015A

United States Patent [19]

Farley

[11] Patent Number: 5,441,015

[45] Date of Patent: Aug. 15, 1995

[54] COMPRESSION BOOT AND METHOD FOR TREATMENT OF INJURED LIMB

[76] Inventor: Michael D. Farley, 2294 N. Riverside Dr., Indialantic, Fla. 32903

[21] Appl. No.: 808,890

[22] Filed: Dec. 18, 1991

Related U.S. Application Data

[63] Continuation-in-part of Ser. No. 747,389, Aug. 20, 1991, abandoned.

[51] Int. Cl.[6] .............................................. A01K 29/00

[52] U.S. Cl. .......................................... 602/28; 54/82; 119/816; 602/27

[58] Field of Search ................... 54/82; 119/97.2, 143; 36/120, 117, 118, 120; 128/846, 881, 882; 602/5, 6, 16, 23, 26, 27, 28, 29

[56] References Cited

U.S. PATENT DOCUMENTS

| | | | |
|---|---|---|---|
| 65,231 | 5/1867 | Jennings | 54/82 |
| 211,897 | 2/1979 | Fenton | 54/82 |
| 235,447 | 12/1880 | Milliman | 54/82 |
| 280,107 | 6/1883 | Wild | 54/82 |
| 317,525 | 5/1885 | Fennell | 54/82 |
| 349,668 | 9/1886 | St. John | 54/82 |
| 1,395,689 | 11/1921 | McKenzie | 54/82 |
| 2,937,487 | 5/1960 | Dever | 54/82 |
| 3,792,537 | 2/1974 | Plank et al. | 36/120 X |
| 3,868,783 | 3/1975 | Caporicci | 36/120 |
| 4,439,016 | 9/1982 | Glassman et al. | |
| 4,907,354 | 3/1990 | Benoit et al. | 36/120 X |

FOREIGN PATENT DOCUMENTS 370786 3/1923 Germany .

*Primary Examiner*—Sam Rimell

*Attorney, Agent, or Firm*—Dickinson, Wright, Moon, Van Dusen & Freeman

[57] ABSTRACT

An article for treatment of an injured leg of a horse includes front and rear pivotally attached parts. The two parts form a cavity for receiving the leg when in a closed position and allow the leg to be received or removed when an open position. In a first embodiment, one portion of the rear part receives the hoof of the leg, and the hoof is captured between lower portions of the front and rear parts as the front part is rotated toward the closed position but before the closed position is reached. In a second embodiment, the hoof of the leg is received by the front part. The capturing of the hoof before the front and rear parts are brought into full engagement allows the injured leg to be placed in tension to set the leg before the leg is fully encased in the inner lining of the article.

1 Claim, 2 Drawing Sheets

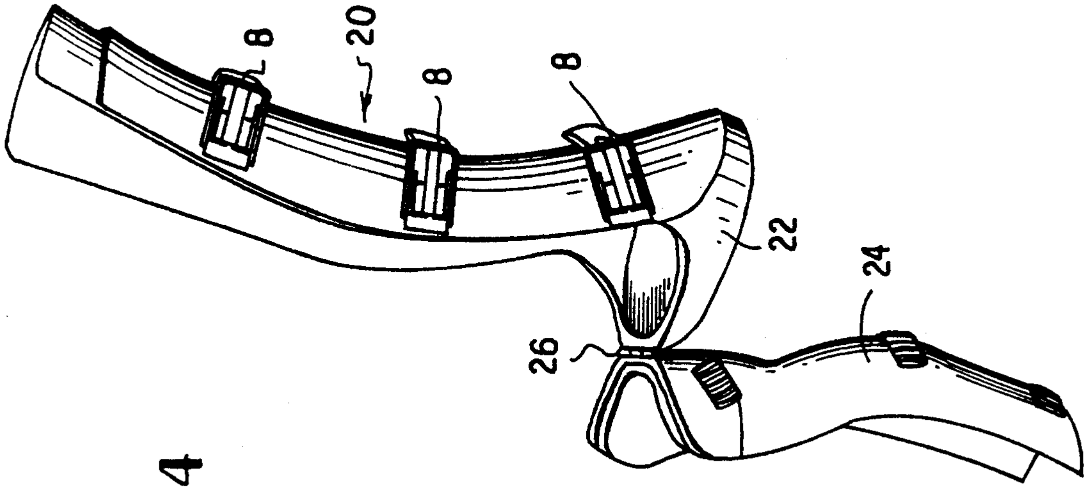
FIG. 4
FIG. 3
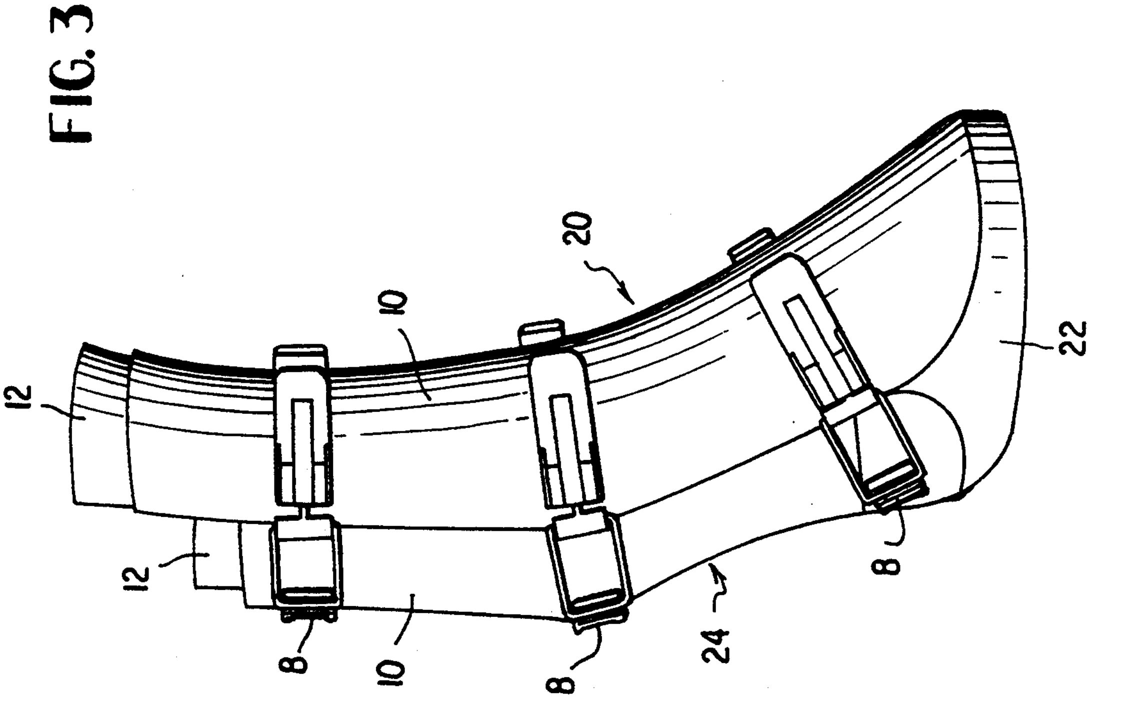

COMPRESSION BOOT AND METHOD FOR TREATMENT OF INJURED LIMB

CROSS REFERENCE TO RELATED APPLICATION

This is a continuation in part of U.S. application Ser. No. 07/747,389, which was filed on Aug. 20, 1991, now abandoned.

TECHNICAL FIELD

This invention relates to the-art of methods and apparatus for treating an injured leg of an animal, preferably a horse.

BACKGROUND ART

Treatment of an injured leg of a horse, such as a broken foreleg, often requires the hoof to be held while a force is applied to allow the bones to set. This is a difficult procedure, and the horse is usually sedated while the veterinarian performs the process. After the leg has been set, it may be placed in a cast (either plaster or fiberglass), but this presents problems because the horse resists having such a foreign object on its leg.

Moreover, examination of the leg having a cast thereon requires that the cast be removed and another cast applied. Removal of the cast is generally accomplished by sawing and also requires the horse to be sedated. Because of the complications of this procedure, veterinarians do not examine the leg as often as they should.

Treatment of a broken leg is usually accomplished in the clinic of the veterinarian, which means that the horse with the broken leg must be transported to the veterinarian. Many horses do not recover from a broken leg because of the trauma associated with this transport from the place of injury.

SUMMARY OF THE INVENTION

In accordance with the invention, a boot-like article is provided for application to the leg of the horse to treat an injury. It will be appreciated that animals other than a horse can be treated with the instant invention. The article comprises two parts which are preferably attached to each other at the front of the boot by a hinge. The parts form an enclosure for the leg and hoof when they are held together and separate to allow the leg to be placed in the article.

In a first embodiment, the rear part of the article has a platform-like portion on which the hoof of the horse is placed, and other portions of the rear part partially surround the lower part of the injured leg when the hoof is so placed. The front part of the article is hinged to the rear part and cooperates with the rear part to form an enclosure for receiving the injured leg. The front part has a portion which engages the front of the hoof as the front part is moved into mating position with the rear part but before full mating occurs. Thus, the hoof is securely engaged in the article before the remainder of the leg is engaged. This allows a force to be applied to the hoof by pulling downward on the article to allow a broken leg to be set. After the leg has been set, the front part is rotated further to mate with the rear part to force it into the rear part to immobilize it during healing.

In a second embodiment, the front part provides a platform for receiving the hoof of the animal,and the front and rear parts are hinged at the rear of the platform.

An advantage of the second embodiment is its ease of application to an injured, standing animal. For example, a horse having an injured leg typically stands on three legs with the injured leg held off the ground. With the horse in this position, the veterinarian holds the device in one hand and brings the front part into engagement with the injured leg, which is being held up by the horse. The rear part is then quickly closed on the front part with the other hand.

The article of each embodiment is preferably made of a hard plastic outer shell and includes a compressible inner lining. The inner lining is preferably medium density polyurethane foam.

Because the article of the invention is easily applied and can assist in the setting of the leg, it can be applied at the location where the injury occurred, such as at a race track. This means that the leg of the horse can be immediately stabilized by application of the inventive article, and if additional treatment by the veterinarian is required, the article can be easily removed and applied again.

BRIEF DESCRIPTION OF THE DRAWINGS

FIG. 3 is a side view of an article in accordance with a second embodiment of the invention.

FIG. 4 is a perspective of the article of FIG. 3 in an open position.

DETAILED DESCRIPTION OF THE PREFERRED EMBODIMENT

Figure 1:
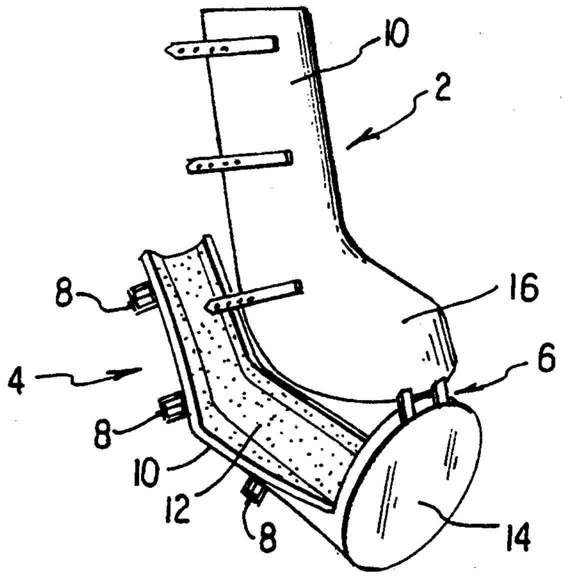
FIG. 1 is a perspective of an article in accordance with a first embodiment of the invention in an open position.
Figure 2:
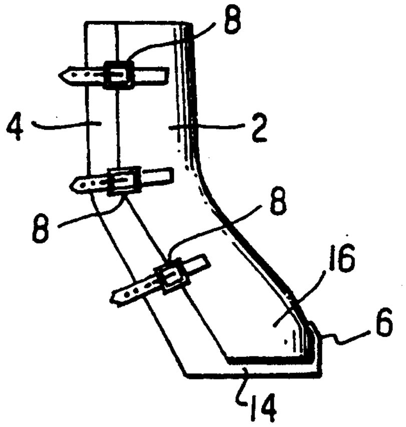
FIG. 2 is a side view of the article of FIG. 1 in a closed position.

With reference to FIGS. 1 and 2, a first embodiment of the article of the invention, comprises a front part 2 and a rear part 4. The front and rear parts are connected at their fronts by a hinge 6 so that they may be pivotally moved with respect to each other. The article includes buckles 8 which hold the two parts together when in the closed position shown in FIG. 2.

Each of the parts includes a hard plastic outer shell 10 and a resilient inner lining 12. The inner lining is preferably molded to the general shape of the leg to be treated whereby the two parts form an enclosure for receiving the leg and which substantially matches the shape of the leg.

The angle of the part of the article which engages the fetlock is preferably oriented at 135° with respect to the portion of the article which engages the upper part of the leg. This angle is that which is ordinarily desired for orthopaedic plating of the leg. The portion below the fetlock portion engages the wall of the hoof, and the angle with respect to the fetlock portion is made to match the natural hoof wall angle.

The rear part includes a hoof portion 14 which is generally flat and is designed to receive the lower part of the hoof of the leg to be treated. In the first step of a preferred application of the article to the leg of a horse, the hoof is placed on the portion 14, and the lower part of the leg is laid in the inner lining 12 of the rear part. The front part 2 is then pivoted to close over the rear part 4, ultimately to the condition shown in FIG. 2. As the front part is pivoted, however, a lower portion 16 of the first part will first engage the front wall of the hoof.

This engagement will clamp the hoof between the portion 14 of the rear part and portion 16 of the front part before the leg is fully encased in the cavity formed by the lining of the front and rear parts.

Clamping of the hoof allows the hoof to be pulled to place the leg in tension and allow the broken bone to be set. This is effected easily by applying the force necessary to close the two parts, the leg being set as the two parts are forced into the closed position of FIG. 2.

After the leg has been set, the two parts are brought into full engagement and secured to each other by buckles 8. The inner lining of the front part will press the leg into the foam lining of the rear part to secure the leg in the cavity formed between the front and rear parts.

Referring now to FIGS. 3 and 4, a second embodiment of the invention is similar to the first embodiment described above. A first part 20 provides a platform 22 for receiving the hoof of the animal. A rear part 24 is pivotally attached to the rear edge of the platform 22 by a hinge 26. Buckles 8 are provided as in the first embodiment described above to hold the front and rear part together after the injured leg has been located in the device. Other parts of the first embodiment which are similar to that described above have been identified with the same reference numbers.

Modifications within the scope of the appended claims will be apparent to those of skill in the art.

I claim:

1. A method for treatment of an injured limb of an animal comprising securing a foot of said limb between first parts of an apparatus comprising first and second parts for forming a substantially rigid enclosure for said limb when in a closed position and means for attaching said first and second parts to each other for movement between an open position for receiving said limb and said closed position, wherein each of said first and second parts comprises a rigid outer shell and an inner lining for conforming to the shape of said limb when said first and second parts are in said closed position and means for receiving a foot of said limb and a portion of said limb remote from said foot for providing adequate strength for an animal to support itself on said injured limb when in said closed position, applying a longitudinal force to said limb to place said limb in tension, and moving said first and second parts of said apparatus to said second position.

* * * * *